United States Patent Office 3,642,949
Patented Feb. 15, 1972

3,642,949
IMPACT RESISTANT, HIGH HEAT DISTORTION COMPOSITION
Owen L. Stafford and Jack J. Adams, Midland, Mich., assignors to The Dow Chemical Company, Midland, Mich.
No Drawing. Filed Mar. 28, 1969, Ser. No. 811,670
Int. Cl. C08f 41/12, 19/02
U.S. Cl. 260—876 R                    7 Claims

ABSTRACT OF THE DISCLOSURE

Compositions comprising a blend of a polydiene rubber nitrile graft copolymer such as a styrene-acrylonitrile graft of polybutadiene and a thermoplastic resin such as styrene-maleic anhydride provide impact strength and high heat distortion as well as a good balance of other physical properties when certain compositions and proportions are used.

Background of the invention

This invention relates to high heat distortion, high impact thermoplastic compositions. In particular it relates to styrene containing thermoplastics. High impact polystyrene compositions are known, but polystyrene is notably deficient in its resistance to elevated temperatures and to certain solvents. To overcome these deficiencies, polystyrene has been modified by copolymerizing styrene with a comonomer such as acrylonitrile and the like but it has proven difficult to improve one property without detracting from another. Additionally the comonomers greatly alter the compatibility of the rubber modifiers with the thermoplastic resin making it difficult to blend or mill the two components together.

In order to improve compatibility the art appears to prefer selecting a rubber which has been prepared with the same or chemically similar type of monomer as used in the modified thermoplastic, e.g. a nitrile rubber blended with a styrene-acrylonitrile thermoplastic. Graft copolymers of various rubbers, frequently polybutadiene, are prepared from similarly selected monomers to obtain compatibility, e.g. a styrene, acrylonitrile graft copolymer of polybutadiene blended with styrene-acrylonitrile copolymer.

One comonomer which greatly improves the heat distortion and solvent resistance of a styrene copolymer is maleic anhydride and like monomers. However, styrene-maleic anhydride copolymers have poor impact properties, and attempts to improve the impact strength by blending rubber modifiers therewith give erractic and unpredictable results when the compatibility problems can be overcome. It is proposed in U.S. 2,914,505 to blend a nitrile rubber with a terpolymer of styrene-acrylonitrile-maleic anhydride, yet even with a common monomer (acrylonitrile) there is incompatibility between the rubber and the terpolymer.

Summary of the invention

Unexpectedly, in view of the prior art and in contradistinction to the use of a common monomer in both the rubber and the thermoplastic to obtain compatibility, it has been found that certain polydiene rubber nitrile graft copolymers are compatible with styrene-maleic anhydride and like thermoplastic copolymers and when blended together compositions having both high heat distortion and impact properties are obtained.

The high impact and heat distortion benefits of this invention are obtained only when certain proportions and compositions of the graft copolymer and thermoplastic are intimately admixed. In admixed form the compositions comprise from about 10-40 weight percent of rubber, polydiene basis, and at least about 20 weight percent of said thermoplastic copolymer. Additionally the ratio of graft monomers to polydiene rubber ranges from about 25:75 to 70:30.

The invention further contemplates certain ternary compositions wherein the styrene-maleic anhydride thermoplastic is partially replaced by a styrene-acrylonitrile and like thermoplastic.

Detailed description of the invention

The binary and ternary compositions of this invention contain from about 10 to 40 weight percent of rubber (polydiene basis) in the form of a nitrile graft copolymer of said polydiene rubber. The total proportion of nitrile graft copolymer in said compositions will be greater than 10–40 percent dependent on the weight of monomers graft polymerized to said polydiene. The weight ratio of grafting monomers to polydiene rubber has been determined to vary from 25:75 to 70:30.

The polydiene rubber nitrile graft copolymers are well known and methods for their preparation have been adequately described in the literature, such as is found in U.S. 3,053,800, U.S. 2,802,809 and elsewhere. Briefly the graft copolymers are generally produced by adding a monomeric mixture containing a vinyl nitrile monomer to an already compyletely or nearly completely free-radical polymerized polydiene rubber and free-radical polymerization is then continued to prepare the graft copolymer. It is believed that during copolymerization the monomers combine with active sites along the already polymerized polydiene rubber resulting in branching or the formation of side chains of polymerized monomers attached to the polydiene rubber polymer chains. Whether or not this is the mechanism involved the monomers appear to combine with themselves and said rubber in such a manner that only small amounts of polymers or copolymers which would result from the monomer mixture alone can be separated from the graft copolymer product. Such a product is referred to herein as a polydiene rubber nitrile graft copolymer.

Polydiene rubbers (elastomers) may be prepared in accordance with any usual or suitable procedure in this art. Preferably the rubber is polybutadiene, but polydiene rubbers prepared from a mixture of conjugated diolefins, or rubbers which comprise at least 60 weight percent of a conjugated diolefin and the balance comprised of copolymerizable monomers may also be used and are included within the term polydiene rubber as used herein. Conjugated diolefins include butadiene, isoprene, chloroprene and the like. Suitable copolymerizable monomers include acrylonitrile and methacrylonitrile; alkenyl aromatic monomers such as styrene, α-methyl styrene, vinyl toluene, halogenated styrenes such as chlorostyrene, alkylated styrenes such as t-butyl stryene, and the like; and a large variety of other known monomers including divinyl benzene and the like.

The mixture of grafting monomers suitable for preparing the polydiene rubber nitrile graft copolymers comprises a vinyl nitrile monomer and at least one other copolymerizable monomer. Vinyl nitriles include acrylonitrile, methacrylonitrile and the like. Copolymerizable monomers include alkenyl aromatic monomers such as have been previously described, lower alkyl esters of acrylic and methacrylic acid such as methyl methacrylate and the like. The weight ratio of the copolymerizable monomer to the nitrile monomer may be varied from about 95/5 to 60/40.

The styrene-maleic anhydride and like thermoplastic polymers comprise in polymerized form from about 5 to 35 weight percent of an unsaturated dicarboxylic acid anhydride, the imides thereof, the N-alkylimides thereof wherein the alkyl group contains from 1 to 4 carbon atoms or mixtures thereof, and the balance of about 95 to 65 weight percent of a monovinyl aromatic monomer. Said polymer should have a viscosity of at least about 2 cps., measured as a 10 weight percent solution in methyl ethyl ketone at 25° C., and preferably from 4 to 12 cps.

Unsaturated dicarboxylic acid anhydrides which are suitable include maleic anhydride, citraconic anhydrides, itaconic anhydride, aconitic anhydride and the like. Imides include the imides of said anhydrides such as maleimide and the N-alkyl imides of said anhydrides include N-ethyl maleimide and the like. Monovinyl aromatic monomers include styrene, α-methyl styrene, vinyl toluene, halogenated styrenes, alkyl substituted styrenes and the like. Preferably the polymer is a copolymer of styrene and maleic anhydride.

The preparation of said copolymers is taught in the art, as for example, the continuous methods described in U.S. 2,769,804 and U.S. 3,336,267. The latter patent discloses methods of preparing substantially homogeneous copolymers which may advantageously be used in this invention. It is also to be understood that the thermoplastic copolymers containing imide and substituted imides may be advantageously prepared from the anhydride copolymers by aminating the anhydride group and heating. Aminating agents include ammonia, methyl amine, ethyl amine, etc. By this method it is possible to convert only a portion of the anhydride groups to imide groups, if desired.

Mixing of the polydiene rubber nitrile graft copolymer and the thermoplastic copolymer may be accomplished in different ways, but usually includes a step where the components are mechanically worked at a temperature high enough to plasticize the mass, such as by milling on a roll mill, or an internal mixer of the Banbury type or by compounding in a Meili mixer. The temperature will vary depending on the thermoplastic copolymer composition, but temperatures in the range of 160° C. to about 200° C. and higher have been found adequate.

The following non-limiting examples will further illustrate this invention. All parts and percentages are by weight unless otherwise specified.

Example 1

The preparation of a polydiene rubber nitrile graft copolymer will be described. In a reactor suitably equipped for control of temperature, stirring, etc. was placed 251 gms. of a commercial polybutadiene latex (FRS-2004, 59.9% solids). To this was then added a mixture of 499 gms. of ion-exchanged water, 2.14 gms. of dextrose, 11.5 gms. of 1.0 N NaOH and 4.3 gms. of Dresinate 731 (70% active). The ingredients were then heated to 60° C. while bubbling nitrogen through same. A mixture of 0.107 gm. of FeSO$_4$·7H$_2$O and 1.07 gms. sodium pyrophosphate in 100 gms. of water was then prepared, heated to 90° C. and added to the reactor.

A monomer-catalyst mixture was prepared and added in seven equal portions over a period of about two hours. The mixture contained 108 gms. styrene, 42 gms. acrylonitrile and 1.6 gms. cumene hydroperoxide. After all the monomer was added the ingredients were stirred at 60° C. for an additional two hours, then cooled and filtered.

The grafted rubber latex was coagulated by adding three times its volume of water and slowly adding a 2% aluminum sulfate solution with stirring. The slurry pH was adjusted to 8 with 1.0 N NaOH and 0.5% (basis of solids) of ionol (2,6-di-tert.-butyl-p-cresol) dissolved in methanol was added. The slurry was then heated to 90° C. to increase the particle size of the coagulum followed by cooling.

The polymer was then filtered, washed thoroughly with water and dried in a vacuum oven at 50-60° C. yielding 270 gms. of a dry powder which contained 3.14% N by analysis. The final product contained about 50 percent polydiene rubber and about 50 percent grafted monomers.

Example 2

A composition containing a stabilizer and a mold release agent was prepared by blending on 3" x 8" compounding rolls (Thropp rolls) 36.0 gms. of said nitrile graft rubber, 63.2 gms. of a styrene-maleic anhydride copolymer (18% maleic anhydride, 8 cps. visc.), 0.5 gm. of Ionol and 0.3 gm. of MRA–1 behenic acid. The steam heated front roll was 430° F. and the rear roll 270° F. The composition was blended for 15 minutes after all the ingredients were added and the hot blanket was cut into large cubes which were then ground. Compression molded test specimens were made which had an Izod impact of 2.1 ft.-lbs./in.-notch, a tensile yield strength of 5460 p.s.i. and an elongation of 2.3%. The styrene-maleic anhydride (SMA) copolymer, itself, has an impact of about only 0.3.

Example 3

The effect of SMA viscosity was evaluated using the polybutadiene styrene-acrylonitrile graft copolymer of Example 1. The SMA resins all contained about 18% maleic anhydride and varied from 4 to 12 cps. in viscosity, as shown in Table I.

TABLE I

|  | Example | | | |
|---|---|---|---|---|
|  | 3a | 3b | 3c | 3d |
| SMA viscosity, cps | 4 | 4 | 8 | 12 |
| Percent: | | | | |
| SMA in blend | 56 | 64 | 64 | 64 |
| Graft in blend | 44 | 36 | 36 | 36 |
| Rubber in blend | 22 | 18 | 18 | 18 |
| Izod impact, ft.-lbs./in.-notch | 1.9 | 1.1 | 2.1 | 2.1 |
| Vicat temperature, ° C | 133 | 134 | 138 | 138 |
| Tensile yield strength, p.s.i | 4,990 | 4,790 | 5,460 | 5,230 |

In addition to improving the impact by increasing the amount of rubber (graft copolymer) impact is also improved as the viscosity of SMA increases.

Example 4

Additional tests varied the maleic anhydride content of the SMA resin. The blends were all prepared to contain 64% SMA and 36% of a polybutadiene graft copolymer similar to Example 1 (equivalent to 18% rubber). Compression molded test specimens were prepared and tested as before, as shown in Table II.

TABLE II

|  | Example | | | | | | |
|---|---|---|---|---|---|---|---|
|  | 4a | 4b | 4c | 4d | 4e | 4f | 4g |
| SMA, percent maleic anhydride | 5 | 18 | 18 | 25 | 25 | 33 | 48 |
| SMA, viscosity, cps | 8 | 4 | 8 | 4 | 8 | 4 | 4 |
| Izod impact, ft.-lbs./in.-notch | 0.5 | 0.6 | 1.3 | 1.0 | 1.9 | 1.3 | 0.5 |
| Vicat temperature, ° C | 112 | 130 | 133 | 139 | 145 | 162 | 176 |
| Tensile yield strength, p.s.i | 3,260 | 4,530 | 5,710 | 5,400 | 5,720 | 2,580 | 2,740 |

While improvements in impact and heat distortion are found throughout this range, the best combination of properties is found with the 18% and 25% maleic anhydride compositions. Below about 5% maleic both the Vicat temperature and the impact falls off and above about 33% maleic anhydride the Vicat temperature becomes too high, which from a practical standpoint makes blending difficult because the SMA resin has poor melt flow properties.

Example 5

The proportions of rubber were evaluated with two SMA resins each containing 18% maleic anhydride but one having a viscosity of 4 cps. and the other of 8 cps. The graft copolymer was prepared similar to that of Example 1 and contained about 50% polybutadiene and 50% graft polymerized styrene (72) and acrylonitrile (28) monomers. Compression molded samples were prepared and tested as before.

The results indicate that as little as 10% rubber provides both improved impact as well as high heat distortion. Also the compositions should contain at least about 20% SMA thermoplastic resin in order to obtain a good balance of tensile strength, heat distortion temperature and impact strength, as shown in Table III.

Example 6

The ratio of acrylonitrile to styrene in the preparation of polybutadiene graft copolymers similar to Example 1 was also evaluated. The molding compositions were prepared to contain 64% of an 8 cps. SMA resin (18% maleic anhydride) and 36% of the graft copolymer in which the weight ratio of rubber (polybutadiene) to monomers was 1:1, as shown in Table IV.

TABLE III

| | Example | | | | | | | | | |
|---|---|---|---|---|---|---|---|---|---|---|
| | 5a | 5b | 5c | 5d* | 5e | 5f | 5g | 5h | 5i | 5j |
| Percent SMA resin | 80 | 72 | 64 | 64 | 56 | 6 | 50 | 35 | 20 | 0 |
| Viscosity | 8 | 8 | 8 | 8 | 8 | 4 | 4 | 4 | 4 | 4 |
| Percent: | | | | | | | | | | |
| Graft copolymer | 20 | 28 | 36 | 36 | 44 | 36 | 50 | 65 | 80 | 100 |
| Rubber | 10 | 14 | 18 | 18 | 22 | 18 | 25 | 32.5 | 40 | 50 |
| Izod impact, ft.-lb./in.-notch | 0.7 | 0.9 | 1.5 | 1.7 | 2.1 | 0.6 | 1.1 | 2.5 | 5.8 | 8.0 |
| Vicat temperature, °C | 137 | 137 | 137 | 136 | 136 | 130 | 127 | 123 | 119 | 106 |
| Tensile yield strength, p.s.i. | 6,210 | 5,650 | 4,640 | 5,470 | 4,550 | 4,530 | 4,690 | 4,240 | 3,530 | 2,320 |

*Injection molded.

TABLE IV

| | Example | | | | |
|---|---|---|---|---|---|
| | 6a | 6b | 6c | 6d | 6e |
| Ratio acrylonitrile/styrene | 5/95 | 15/85 | 25/75 | 35/65 | 40/60 |
| Izod impact, ft.-lbs./in.-notch | 1.3 | 2.2 | 2.1 | 1.7 | 1.0 |
| Vicat temperature, °C | 140 | 135 | 137 | 138 | 138 |
| Tensile yield strength, p.s.i. | 4,240 | 5,280 | 5,540 | 5,050 | 5,610 |

Similar results were obtained with a SMA polymer containing 25% maleic anhydride.

Example 7

A thermoplastic copolymer essentially comprising a copolymer of styrene-maleimide was prepared by ammoniating a SMA resin (18% maleic anhydride, 4 cps.) and heating. Styrene-N-ethyl maleimide copolymers were also prepared from a SMA resin (18% maleic anhydride, 12 cps.) by reaction with ethylamine and heating. In one case sufficient ethylamine was used to convert about one-half of the anhydride groups and in the other enough to convert essentially all the anhydride groups. The graft copolymer used had a rubber to monomer ratio of about 1:1 and about 25% of the monomer portion was acrylonitrile.

| | Imide | N-ethylimide (50%) | N-ethylimide (100%) |
|---|---|---|---|
| Izod impact, ft.-lb/in.-notch | 0.55 | 2.1 | 0.54 |
| Vicat temp., °C | 145 | 141 | 135 |
| Tensile yield strength, p.s.i. | 4,370 | 5,360 | 4,720 |

It has also been found that up to about 50 percent of the styrene-maleic anhydride and like thermoplastics may be replaced within styrene-acrylonitrile and like copolymers. Increasing amounts above this level continue to improve impact strength but the heat distortion properties fall off. Such polymers usually contain from about 5 to 50 weight percent of acrylonitrile, methacrylonitrile or like nitrile monomers with the balance comprising a monovinyl aromatic monomer such as styrene, vinyl toluene, α-methyl styrene, mixtures thereof, and the like.

Example 8

In a molding composition according to this invention containing 64% of a SMA resin and 36% of a graft copolymer, partial replacement of the SMA by a styrene-acrylonitrile (71/29) copolymer was made. The graft rubber contained a 1:1 ratio of rubber of graft monomers and about 28% of the graft monomers was acrylonitrile, similar to the previous examples, as shown in Table V.

There are several variables which can be adjusted to alter the final heat distortion or impact properties—the proportions of rubber graft copolymer and thermoplastic; the proportion of rubber in the graft copolymer; the ratio of graft monomer; the viscosity of the thermoplastic copolymer; and the percent of maleic anhydride, etc. in the thermoplastic. Any or all of these variables can be altered within the ranges specified herein to provide a high impact, high heat distortion resin having a good balance of other properties.

The molding compositions of this invention may also contain several other materials or additives which are well known and used, materials such as fillers (clay, silica, etc.), reinforcing fibers (glass, asbestos, etc.), pigments, colorants, stabilizers, mold release agents, etc. One may also add polyols such as dipropylene glycol, ethylene glycol and the like which crosslink the composition where it has been found that the crosslinking is reversible upon heating to elevated temperatures.

TABLE V

| | Proportions, percent | | Izod impact, ft.-lbs./in.-notch | Tensile, p.s.i. | Vicat, °C |
|---|---|---|---|---|---|
| | SMA | Sty/VCN | | | |
| Example 8: | | | | | |
| a | [1]64 | 0 | 1.34 | 5,710 | 133 |
| b | 48 | 16 | 1.16 | 5,160 | 134 |
| c | 32 | 32 | 1.73 | 5,520 | 124 |
| d | [2]64 | 0 | 0.98 | 5,400 | 139 |
| e | 48 | 16 | 1.08 | 5,740 | 130 |
| f | 32 | 32 | 1.21 | 5,940 | 123 |
| g | [3]64 | 0 | 1.89 | 5,720 | 145 |
| h | 48 | 16 | 1.78 | 5,010 | 137 |
| i | 32 | 32 | 2.03 | 5,760 | 123 |
| j | 0 | 64 | 4.94 | 5,870 | 109 |

[1] 8 cps., 18 percent MA.
[2] 4 cps., 25% MA.
[3] 8 cps. 25% MA.

What is claimed is:
1. An impact resistant, high heat distortion molding composition which comprises in admixture
 (a) at least about 20 weight percent of a thermoplastic copolymer consisting of about 5 to 35 weight percent of an unsaturated dicarboxylic acid anhydride, imides thereof, N-alkyl imides thereof wherein the alkyl group contains from 1 to 4 carbons or mixtures thereof and about 95 to 65 weight percent of a monovinyl aromatic monomer, said thermoplastic having a viscosity of at least 2 cps. measured as a 10 weight percent solution in methyl ethyl ketone at 25° C.; and

(b) a sufficient amount of a polydiene rubber nitrile graft copolymer to provide about 10 to 40 weight percent rubber, polydiene basis, wherein the weight ratio of polydiene rubber to graft monomers in said graft copolymer ranges from about 75/25 to 30/70.

2. An impact composition according to claim 1 wherein said thermoplastic has a viscosity of about 4 to 12 cps.

3. An impact composition according to claim 1 wherein said thermoplastic contains from about 15 to 25 weight percent of said anhydrides or imides.

4. An impact composition according to claim 1 wherein said thermoplastic is a styrene-maleic anhydride copolymer.

5. An impact composition according to claim 1 wherein said graft monomers comprises from 5 to 40 weight percent of a nitrile monomer and from 95 to 60 weight percent of a monovinyl aromatic monomer.

6. An impact composition according to claim 5 wherein said graft copolymer is a styrene: acrylonitrile graft copolymer of polybutadiene.

7. An impact composition according to claim 1 further comprising the replacement of up to 50 weight percent of said thermoplastic by a copolymer of a monovinyl aromatic monomer and a nitrile monomer.

References Cited
UNITED STATES PATENTS

| | | | |
|---|---|---|---|
| 2,802,808 | 8/1957 | Hayes | 260—876 X |
| 2,914,505 | 11/1959 | Roper et al. | 260—893 X |
| 2,971,939 | 2/1961 | Baer | 260—876 X |
| 3,414,636 | 12/1968 | Ott et al. | 260—876 |

MURRAY TILLMAN, Primary Examiner

H. ROBERTS, Assistant Examiner

U.S. Cl. X.R.

260—41.5 A, 78.5 BB, 880 R, 898

PO-1050
(5/69)

UNITED STATES PATENT OFFICE
CERTIFICATE OF CORRECTION

Patent No. 3,642,949　　　　　　　　Dated　　15 February 1972

Inventor(s)　Owen L. Stafford and Jack Adams

It is certified that error appears in the above-identified patent and that said Letters Patent are hereby corrected as shown below:

Column 5, line 27, insert --grafting-- at the end of the line after "to".

Column 5, Table III, first line under column "5f" change "6" to --64--.

Column 5, line 73, delete "within" and insert --with--.

Column 6, line 12, change "rubber of graft" to --rubber to graft--.

Column 8, line 13, add under References Cited:
　　　--670,964　　9-1963　　Canada　　　　260-880　　　--

Signed and sealed this 19th day of September 1972.

(SEAL)
Attest:

EDWARD M. FLETCHER, JR.　　　　　　ROBERT GOTTSCHALK
Attesting Officer　　　　　　　　　Commissioner of Patents